United States Patent
Palin et al.

(10) Patent No.: US 9,544,755 B2
(45) Date of Patent: Jan. 10, 2017

(54) METHOD, APPARATUS, AND COMPUTER PROGRAM PRODUCT FOR NON-SCANNABLE DEVICE DISCOVERY

(71) Applicant: Nokia Technologies Oy, Espoo (FI)

(72) Inventors: Arto Palin, Viiala (FI); Jukka Reunamaki, Tampere (FI); Tapani Mikola, Tampere (FI); Juha Salokannel, Tampere (FI)

(73) Assignee: Nokia Technologies Oy, Espoo (FI)

( * ) Notice: Subject to any disclaimer, the term of this patent is extended or adjusted under 35 U.S.C. 154(b) by 116 days.

(21) Appl. No.: 14/609,464

(22) Filed: Jan. 30, 2015

(65) Prior Publication Data

US 2016/0227392 A1   Aug. 4, 2016

(51) Int. Cl.
*H04L 5/14*    (2006.01)
*H04B 7/00*    (2006.01)
*H04W 8/00*    (2009.01)
*H04W 4/00*    (2009.01)

(52) U.S. Cl.
CPC ............. *H04W 8/005* (2013.01); *H04W 4/008* (2013.01)

(58) Field of Classification Search
CPC .............................. H04W 8/005; H04W 4/008
See application file for complete search history.

(56) References Cited

U.S. PATENT DOCUMENTS

| | | | |
|---|---|---|---|
| 8,879,471 B2 | 11/2014 | Kneckt et al. | |
| 9,100,801 B2 * | 8/2015 | Jung | |
| 2004/0162944 A1 * | 8/2004 | Kim | G06F 12/0848 711/120 |
| 2010/0141400 A1 * | 6/2010 | Radulescu | H04W 52/0225 340/10.33 |
| 2013/0109314 A1 | 5/2013 | Kneckt et al. | |
| 2014/0295832 A1 * | 10/2014 | Ryu | H04W 48/16 455/434 |
| 2015/0296326 A1 * | 10/2015 | Wisse | H04W 48/02 455/41.2 |
| 2015/0350279 A1 * | 12/2015 | Palin | H04L 65/80 370/328 |
| 2015/0373749 A1 * | 12/2015 | Palin | H04W 76/02 455/41.2 |
| 2016/0007181 A1 * | 1/2016 | Palin | H04W 8/005 455/41.2 |
| 2016/0088708 A1 * | 3/2016 | Anthony | H05B 37/029 315/294 |
| 2016/0100275 A1 * | 4/2016 | Viswanadham | H04W 76/02 455/41.2 |
| 2016/0100276 A1 * | 4/2016 | Viswanadham | H04W 8/005 455/41.2 |

* cited by examiner

*Primary Examiner* — Faruk Hamza
*Assistant Examiner* — Abu-Sayeed Haque
(74) *Attorney, Agent, or Firm* — Locke Lord LLP (57) ABSTRACT

In an example embodiment, a method includes determining, by an apparatus, whether the apparatus provides data for other wireless devices to request from the apparatus in response to wireless device discovery messages transmitted by the apparatus; and transmitting, by the apparatus, wireless device discovery messages including an indication that additional information should not be requested from the apparatus in response to the wireless device discovery messages, without establishing a connection with the apparatus, the indication being in response to the determination that the apparatus does not provide data for other wireless devices to request from the apparatus in response to the wireless device discovery messages.

22 Claims, 6 Drawing Sheets

500

Step 502: determining, by an apparatus, whether the apparatus provides data for other wireless devices to request from the apparatus in response to wireless device discovery messages transmitted by the apparatus; and Step 504: transmitting, by the apparatus, wireless device discovery messages including an indication that additional information should not be requested from the apparatus in response to the wireless device discovery messages, without establishing a connection with the apparatus, the indication being in response to the determination that the apparatus does not provide data for other wireless devices to request from the apparatus in response to the wireless device discovery messages.

Step 502: determining, by an apparatus, whether the apparatus provides data for other wireless devices to request from the apparatus in response to wireless device discovery messages transmitted by the apparatus; and Step 504: transmitting, by the apparatus, wireless device discovery messages including an indication that additional information should not be requested from the apparatus in response to the wireless device discovery messages, without establishing a connection with the apparatus, the indication being in response to the determination that the apparatus does not provide data for other wireless devices to request from the apparatus in response to the wireless device discovery messages.

Step 552: receiving, by an apparatus, wireless device discovery messages from a wireless device, including an indication that additional information should not be requested from the wireless device in response to the wireless device discovery messages, without establishing a connection with the wireless device; and Step 554: refraining, by the apparatus, from transmitting information request messages to the wireless device, in response to receiving the wireless device discovery messages, if the apparatus does not wish to establish a connection with the wireless device, in response to the wireless device discovery messages.

FIG. 4

METHOD, APPARATUS, AND COMPUTER PROGRAM PRODUCT FOR NON-SCANNABLE DEVICE DISCOVERY

FIELD

The technology field relates to wireless device discovery and connection setup.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. The Bluetooth™ *Core Specification, Version* 4.2, Bluetooth™ SIG, Dec. 2, 2014 (incorporated herein by reference), describes the Bluetooth™ protocol (BT) and the Bluetooth™ Low Energy protocol (BTLE).

SUMMARY

Method, apparatus, and computer program product example embodiments enhance wireless device discovery.

An example embodiment of the invention includes a method comprising:

determining, by an apparatus, whether the apparatus provides data for other wireless devices to request from the apparatus in response to wireless device discovery messages transmitted by the apparatus; and transmitting, by the apparatus, wireless device discovery messages including an indication that additional information should not be requested from the apparatus in response to the wireless device discovery messages, without establishing a connection with the apparatus, the indication being in response to the determination that the apparatus does not provide data for other wireless devices to request from the apparatus in response to the wireless device discovery messages.

An example embodiment of the invention includes a method comprising:

wherein the apparatus includes information in an advertising channel packet header, to inform other wireless devices that requests for information from the apparatus, shall not be transmitted in response to the wireless device discovery messages.

An example embodiment of the invention includes a method comprising:

wherein the wireless device discovery messages are advertising packets that inform scanning wireless devices that the scanning wireless devices shall not transmit an information request packet in response to the advertising packets, without establishing a connection with the apparatus.

An example embodiment of the invention includes a method comprising:

wherein the wireless device discovery messages are Bluetooth™ Low Energy advertising packets, which use four bits in a Packet Data Unit type (PDU type) field of an advertising channel PDU header, to indicate to scanning wireless devices a need to comply with a rule as to whether the scanning wireless devices are allowed to transmit a Bluetooth™ Low Energy SCAN_REQ packet in response to the advertising packets.

An example embodiment of the invention includes a method comprising:

wherein the wireless device discovery messages are Bluetooth™ Low Energy advertising packets, which use one or more of four bits in a reserved-for-future-use (RFU) field of an advertising channel PDU header, to indicate to scanning wireless devices a need to comply with a rule as to whether the scanning wireless devices are allowed to transmit a Bluetooth™ Low Energy SCAN_REQ packet in response to the advertising packets.

An example embodiment of the invention includes a method comprising:

altering, by the apparatus, the indication that additional information should not be requested from the apparatus, if the apparatus has available information for scanning wireless devices, the alteration including allowing scanning wireless devices to transmit requests for information from the apparatus, on a schedule specified by the apparatus in the wireless device discovery messages.

An example embodiment of the invention includes a method comprising:

altering, by the apparatus, the indication that additional information should not be requested from the apparatus, in response to the apparatus determining a number of received information requests or CRC failures.

An example embodiment of the invention includes a method comprising:

receiving, by an apparatus, wireless device discovery messages from a wireless device, including an indication that additional information should not be requested from the wireless device in response to the wireless device discovery messages, without establishing a connection with the wireless device; and refraining, by the apparatus, from transmitting information request messages to the wireless device, in response to receiving the wireless device discovery messages, if the apparatus does not wish to establish a connection with the wireless device, in response to the wireless device discovery messages.

An example embodiment of the invention includes a method comprising:

transmitting, by the apparatus, one or more wireless connection request messages to the wireless device, if the apparatus wishes to establish a connection with the wireless device, in response to the wireless device discovery messages.

An example embodiment of the invention includes a method comprising:

wherein the wireless device discovery messages are Bluetooth™ Low Energy advertising packets, which use four bits in a Packet Data Unit type (PDU type) field of an advertising channel PDU header, to indicate to the apparatus a need to comply with a rule as to whether the apparatus is allowed to transmit a Bluetooth™ Low Energy SCAN_REQ packet in response to the advertising packets.

An example embodiment of the invention includes a method comprising:

wherein the wireless device discovery messages are Bluetooth™ Low Energy advertising packets, which use one or more of four bits in a reserved-for-future-use (RFU) field of an advertising channel PDU header, to indicate to the apparatus a need to comply with a rule as to whether the apparatus is allowed to transmit a Bluetooth™ Low Energy SCAN_REQ packet in response to the advertising packets.

An example embodiment of the invention includes a method comprising:

transmitting, by the apparatus, requests for information to the wireless device, on a schedule specified by the wireless device in the wireless device discovery messages.

An example embodiment of the invention includes an apparatus comprising:

at least one processor;

at least one memory including computer program code;

the at least one memory and the computer program code configured to, with the at least one processor, cause the apparatus at least to:

determine whether the apparatus provides data for other wireless devices to request from the apparatus in response to wireless device discovery messages transmitted by the apparatus; and transmit wireless device discovery messages including an indication that additional information should not be requested from the apparatus in response to the wireless device discovery messages, without establishing a connection with the apparatus, the indication being in response to the determination that the apparatus does not provide data for other wireless devices to request from the apparatus in response to the wireless device discovery messages.

An example embodiment of the invention includes an apparatus comprising:

wherein the apparatus includes information in an advertising channel packet header, to inform other wireless devices that requests for information from the apparatus, shall not be transmitted in response to the wireless device discovery messages.

An example embodiment of the invention includes an apparatus comprising:

wherein the wireless device discovery messages are advertising packets that inform scanning wireless devices that the scanning wireless devices shall not transmit an information request packet in response to the advertising packets, without establishing a connection with the apparatus.

An example embodiment of the invention includes an apparatus comprising:

wherein the wireless device discovery messages are Bluetooth™ Low Energy advertising packets, which use one or more of four bits in a reserved-for-future-use (RFU) field of an advertising channel PDU header, to indicate to scanning wireless devices a need to comply with a rule as to whether the scanning wireless devices are allowed to transmit a Bluetooth™ Low Energy SCAN_REQ packet in response to the advertising packets.

An example embodiment of the invention includes an apparatus comprising:

the at least one memory and the computer program code configured to, with the at least one processor, cause the apparatus at least to:

alter the indication that additional information should not be requested from the apparatus, if the apparatus has available information for scanning wireless devices, the alteration including allowing scanning wireless devices to transmit requests for information from the apparatus, on a schedule specified by the apparatus in the wireless device discovery messages.

An example embodiment of the invention includes an apparatus comprising:

the at least one memory and the computer program code configured to, with the at least one processor, cause the apparatus at least to:

alter the indication that additional information should not be requested from the apparatus, in response to the apparatus determining a number of received information requests or CRC failures.

An example embodiment of the invention includes an apparatus comprising:

at least one processor;

at least one memory including computer program code;

the at least one memory and the computer program code configured to, with the at least one processor, cause the apparatus at least to:

receive wireless device discovery messages from a wireless device, including an indication that additional information should not be requested from the wireless device in response to the wireless device discovery messages, without establishing a connection with the wireless device; and refrain from transmitting information request messages to the wireless device, in response to receiving the wireless device discovery messages, if the apparatus does not wish to establish a connection with the wireless device, in response to the wireless device discovery messages.

An example embodiment of the invention includes an apparatus comprising:

the at least one memory and the computer program code configured to, with the at least one processor, cause the apparatus at least to:

transmit one or more wireless connection request messages to the wireless device, if the apparatus wishes to establish a connection with the wireless device, in response to the wireless device discovery messages.

An example embodiment of the invention includes an apparatus comprising:

wherein the wireless device discovery messages are Bluetooth™ Low Energy advertising packets, which use one or more of four bits in a reserved-for-future-use (RFU) field of an advertising channel PDU header, to indicate to the apparatus a need to comply with a rule as to whether the apparatus is allowed to transmit a Bluetooth™ Low Energy SCAN_REQ packet in response to the advertising packets.

An example embodiment of the invention includes an apparatus comprising:

the at least one memory and the computer program code configured to, with the at least one processor, cause the apparatus at least to:

transmit requests for information to the wireless device, on a schedule specified by the wireless device in the wireless device discovery messages.

An example embodiment of the invention includes a computer program product comprising computer executable program code recorded on a computer readable, non-transitory storage medium, the computer executable program code comprising:

code for determining, by an apparatus, whether the apparatus provides data for other wireless devices to request from the apparatus in response to wireless device discovery messages transmitted by the apparatus; and code for transmitting, by the apparatus, wireless device discovery messages including an indication that additional information should not be requested from the apparatus in response to the wireless device discovery messages, without establishing a connection with the apparatus, the indication being in response to the determination that the apparatus does not provide data for other wireless devices to request from the apparatus in response to the wireless device discovery messages.

An example embodiment of the invention includes a computer program product comprising computer executable program code recorded on a computer readable, non-transitory storage medium, the computer executable program code comprising:

code for receiving, by an apparatus, wireless device discovery messages from a wireless device, including an indication that additional information should not be requested from the wireless device in response to the wireless device discovery messages, without establishing a connection with the wireless device; and code for refraining, by the apparatus, from transmitting information request messages to the wireless device, in response to receiving the wireless device discovery messages, if the apparatus does not wish to establish a connection with the wireless device, in response to the wireless device discovery messages.

The resulting example embodiments enhance wireless device discovery and connection setup.

DISCUSSION OF EXAMPLE EMBODIMENTS OF THE INVENTION

This section is organized into the following topics:
A. Wireless Short-Range Communication Networks
B. Bluetooth™ Low Energy (LE) Technology
C. Method for Non-Scannable Bluetooth LE Advertiser
A. Wireless Short-Range Communication Networks Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (LE), IEEE 802.11 wireless local area network (WLAN), IEEE 802.15.4, and near field communication technologies, such as radio frequency identification (RFID) and near field communication (NFC) technology that enable contactless identification and interconnection of wireless devices. Bluetooth Technology provides an example of wireless short-range communication establishment.

B. Bluetooth™ Low Energy (LE) Technology

The Bluetooth™ Core Specification, Version 4.2 includes the Bluetooth LE protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, separated by 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Basic Rate/Enhanced Data Rate (BR/EDR) radio. Bluetooth LE supports very short data packets, from 10 octets to a maximum of 47 octets, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.2, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

In the Bluetooth™ Core Specification, Version 4.2, the scanner device, also referred to as the initiator device, receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the scanner/initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV_IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.2, if the advertiser is using a connectable advertising event, an initiator may make a connection request using the same advertising PHY channel on which it received the connectable advertising packet. The advertising event is ended and connection events begin if the advertiser receives and accepts the request for a connection to be initiated. Once a connection is established, the initiator becomes the master device in a piconet and the advertising device becomes the slave device. Within a connection event, the master and slave alternate sending data packets using the same data PHY channel.

According to the Bluetooth™ Specification Version 4.2, Bluetooth LE device discovery involves different operational processes for devices with different roles. In particular:

Slave Device, being an advertiser, performs an advertising process during which the device repeatedly enters Advertising Events. The interval of each start of Advertising Event, Ta, composes of a fixed-length "advInterval" and a random-length "advDelay". In Advertising Event, the device sends advertising Packet Data Units (PDUs) in broadcasting channel 37, 38 and 39, respectively.

Master Device, being an initiator/scanner, performs the initiating/scanning process. An initiating/scanning process consists of repeated "scanInterval", each of which contains a "scanWindow". In a different "scanWindow", the device changes the RF module to receive the state and listens to advertising PDUs on different broadcasting channels; while out of the "scanWindow", it does routine scheduling, or turns off the RF module.

If any advertising PDU is received by an initiator/scanner, it means the initiator/scanner successfully discovers the advertising device. For the initiator, it can directly send back a "CONNECT_REQ" to establish a connection with that advertiser. For a scanner, it can send out a "SCAN_REQ" to ask for more information from that advertiser.

The CONNECT_REQ PDU has a payload field that consists of InitA, AdvA and LLData fields. The InitA field contains the Initiator's public or random device address, as indicated by a transmit address flag. The AdvA field contains the advertiser's public or random device address, as indicated by a receive address flag. The LLData consists of 10 fields, such as the Link Layer connection's Access Address, a channel map, a hop count increment, and other parameters needed to set up the connection.

The SCAN_REQ PDU has a payload field that consists of ScanA and AdvA fields. The ScanA field contains the scanner's public or random device address, as indicated by a transmit address flag. The AdvA field is the address of the device to which this PDU is addressed and contains the advertiser's public or random device address, as indicated by a receive address flag.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

A Bluetooth LE advertising channel may be shared by any number of Bluetooth LE devices. Any number of Bluetooth LE devices may transmit advertising packets while sharing the same three advertising PHY channels. In high-density environments, however, since there are a large number of nodes to be discovered, the probability of broadcasting conflict will inevitably increase, causing network access time to increase, and also lowering the energy efficiency of the whole network.

1. Bluetooth™ LE Discovery:

At the start of each advertising event, the advertiser sends an advertising packet corresponding to the advertising event type. Depending on the type of advertising packet, the scanner may make a request to the advertiser on the same advertising PHY channel which may be followed by a response from the advertiser on the same advertising PHY channel. The advertising PHY channel changes on the next advertising packet sent by the advertiser in the same advertising event. The advertiser may end the advertising event at any time during the event. The first advertising PHY channel is used at the start of the next advertising event.

Initiator devices that are trying to form a connection to another device listen for connectable advertising packets. If the advertiser is using a connectable advertising event, an initiator may make a connection request using the same advertising PHY channel on which it received the connectable advertising packet. The advertising event is ended and connection events begin if the advertiser receives and accepts the request for a connection be initiated. Once a connection is established, the initiator becomes the master device in a piconet and the advertising device becomes the slave device. Connection events are used to send data packets between the master and slave devices.

Devices are identified using a device address. Device addresses may be either a public device address or a random device address. A public device address and a random device address are both 48 bits in length. A device shall contain at least one type of device address and may contain both.

The public device address shall be created in accordance with section 9.2 ("48-bit universal LAN MAC addresses") of the IEEE 802-2001 standard (http://standards.ieee.org/getieee802/download/802-2001.pdf) and using a valid Organizationally Unique Identifier (OUI) obtained from the IEEE Registration Authority (http://standardsleee.org/regauth/oui/forms/ and sections 9 and 9.1 of the IEEE 802-2001 specification).

The public device address is divided into the following two fields:
  company_assigned field is contained in the 24 least significant bits
  company_id field is contained in the 24 most significant bits.

For the purposes of this profile, the random device address may be of either of the following two sub-types:
  Static address
  Private address The private address may be of either of the following two sub-types:
  Non-resolvable private address
  Resolvable private address Static and non-resolvable private address both contains address that is random. The main difference is that the device shall not change its static address value once initialized until the device is power cycled.

The random resolvable private device address is divided into the following two fields which can be used to identify the device:
  hash field is contained in the 24 least significant bits, as defined in Bluetooth™ Core Specification, Version 4.2 [Vol. 3] Part C, Section 10.8.2.3.
  random field is contained in the 24 most significant bits, as defined in Bluetooth™ Core Specification, Version 4.2 [Vol. 3] Part C, Section 10.8.2.2.

2. Bluetooth™ LE Pairing and Bonding

Pairing and key distribution over a BTLE physical link is defined by the Security Manager specification (Bluetooth™ Core Specification, Version 4.2 [Vol. 3], Part H Section 2.3). The pairing process may be initiated if either slave or master device request pairing to enable link encryption and possible authentication.

The purpose of bonding is to create a relation between two Bluetooth devices based on a stored security and identity information. A transport specific key distribution is performed during pairing process to share the keys which can be used to encrypt a link in future reconnections, verify signed data and random address resolution.

LE security uses the following keys and values for encryption, signing, and random addressing:

1. Identity Resolving Key (IRK) is a 128-bit key used to generate and resolve random addresses.

2. Connection Signature Resolving Key (CSRK) is a 128-bit key used to sign data and verify signatures on the receiving device.

3. Long Term Key (LTK) is a 128-bit key used to generate the contributory session key for an encrypted connection. Link Layer encryption is described in Bluetooth™ Core Specification, Version 4.2 [Vol 6] Part B, Section 5.1.3.

4. Encrypted Diversifier (EDIV) is a 16-bit stored value used to identify the LTK. A new EDIV is generated each time a unique LTK is distributed.

5. Random Number (Rand) is a 64-bit stored valued used to identify the LTK. A new Rand is generated each time a unique LTK is distributed.

In order for devices using the privacy feature to reconnect to known devices, the device addresses used when the privacy feature is enabled, private address, must be resolvable to the other devices' identity. The private address is generated using the device's identity key exchanged during the bonding procedure.

The Identity Resolving Key (IRK) is used for resolvable private address construction (see [Part C], Generic Access Profile, Section 10.8.2. A master that has received IRK from a slave can resolve that slave's random resolvable private device addresses. A slave that has received IRK from a master can resolve that master's random resolvable private device addresses. The privacy concept only protects against devices that are not part of the set to which the IRK has been given.

While a device is in the Peripheral or the Central role the device may support the Bonding procedure. While a device is in the Broadcaster or the Observer role the device shall not support the bonding procedure. The Host of the Central initiates the pairing process as defined in Bluetooth™ Core Specification, Version 4.2 [Vol. 3], Part C Section 2.1 with the Bonding_Flags set to Bonding as defined in [Vol. 3], Part H Section 3.5.1. If the peer device is in the bondable mode, the devices shall exchange and store the bonding information in the security database.

If a device has privacy enabled (as defined in Bluetooth™ Core Specification, Version 4.2, Table 10.7), the Host should send it's IRK to the peer device and request the IRK of the peer device during the pairing procedure. The Host can abort the pairing procedure if the authentication requirements are not sufficient to distribute the IRK. If the pairing procedure fails due to authentication requirements and IRK distribution was requested, the pairing procedure should be retried without requesting IRK distribution.

Bluetooth LE Timing in the Advertising, Scanning, and Initiator States:

1. Bluetooth LE Advertising State:

For all undirected advertising events or connectable directed advertising events used in a low duty cycle mode, the time between the start of two consecutive advertising events (T_advEvent) is computed as follows for each advertising event:

$$T\_advEvent = advInterval + advDelay$$

The advInterval shall be an integer multiple of 0.625 ms in the range of 20 ms to 10.24 s. If the advertising event type is either a scannable undirected event type or a non-connectable undirected event type, the advInterval shall not be less than 100 ms. If the advertising event type is a connectable undirected event type or connectable directed event type used in a low duty cycle mode, the advInterval can be 20 ms or greater. The advDelay is a pseudo-random value with a range of 0 ms to 10 ms generated by the Link Layer for each advertising event. Bluetooth™ Core Specification, Version 4.2, FIG. 4.1 shows an example timing diagram of advertising events perturbed in time using advDelay.

2. Bluetooth LE Scanning State:

If the advertiser receives a SCAN_REQ PDU that contains its device address from a scanner allowed by the advertising filter policy, it shall reply with a SCAN_RSP PDU on the same advertising channel index. After the SCAN_RSP PDU is sent, or if the advertising filter policy prohibited processing the SCAN_REQ PDU, the advertiser shall either move to the next used advertising channel index to send another ADV_IND PDU, or close the advertising event. Bluetooth™ Core Specification, Version 4.2, FIG. 4.3 shows an example timing diagram of a connectable undirected advertising event with SCAN_REQ and SCAN_RESP PDUs in the middle of an advertising event.

3. Bluetooth LE Connection Setup in the Initiator State:

If the advertiser receives a CONNECT_REQ PDU that contains its device address, from an initiator allowed by the advertising filter policy, the Link Layer shall exit the Advertising State and transition to the Connection State in the Slave Role. If the advertising filter policy prohibited processing the received CONNECT_REQ PDU, the advertiser shall either move to the next used advertising channel index to send another ADV_IND PDU, or close the advertising event. Bluetooth™ Core Specification, Version 4.2, FIG. 4.13 shows a Master's view on link level connection setup with a non-zero transmitWindowOffset. Bluetooth™ Core Specification, Version 4.2, FIG. 4.14 shows a Master's view on link level connection setup with transmitWindowOffset set to zero.

Figure 2A:
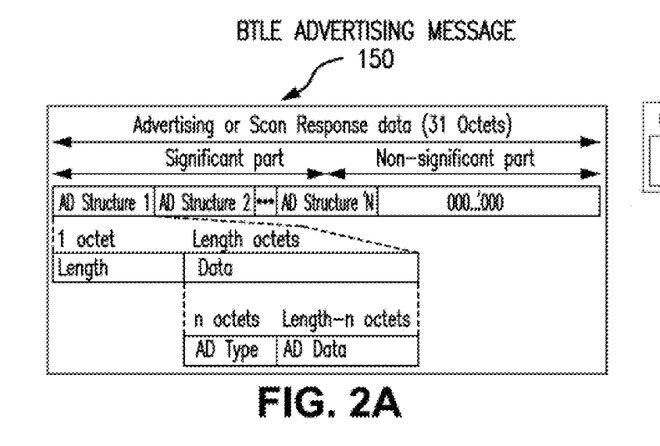
FIG. 2A is an illustration of an example format for the Bluetooth™ Low Energy protocol (BTLE) advertising data, including the new type ADV_NONSCAN_IND advertising packet, in accordance with at least one embodiment of the present invention.

Bluetooth LE Advertising and Scan Response Packet Data:

FIG. 2A is an illustration of an example format for the Bluetooth™ Low Energy protocol (BTLE) advertising and scan response data. The data consists of a significant part and a non-significant part. The significant part contains a sequence of AD structures. Each AD structure shall have a Length field of one octet, which contains the Length value, and a Data field of Length octets. The first octet of the Data field contains the AD type field. The content of the remaining Length–1 octet in the Data field depends on the value of the AD type field and is called the AD data. The non-significant part extends the Advertising and Scan Response data to 31 octets and shall contain all-zero octets. Only the significant part of the Advertising or Scan Response data needs to be sent over the air. The Advertising and Scan Response data is sent in advertising events. The Advertising Data is placed in the AdvData field of ADV_IND, ADV_NONCONN_IND, and ADV_SCAN_IND packets. The Scan Response data is sent in the ScanRspData field of SCAN_RSP packets.

A Bluetooth LE device Link Layer performing active scanning shall listen for advertising PDUs and depending on the advertising PDU type it may request an advertiser to send additional information. The Link Layer shall not send a SCAN_REQ PDU to an advertiser from which an ADV_DIRECT_IND PDU or ADV_NONCONN_IND PDU is received. The Link Layer shall send at least one SCAN_REQ PDU after entering the Scanning State to all advertisers that are allowed by the scanner filter policy from which ADV_IND or ADV_SCAN_IND PDUs are received. The Link Layer should interleave SCAN_REQ PDUs to multiple advertisers. The Link Layer shall continue to send SCAN_REQ PDUs to an advertiser that is allowed by the advertiser filter policy until it has received at least one SCAN_RSP PDU from that advertiser.

However, for example current implementations send SCAN_REQ as a response to every advertising packet they receive and therefore one device blocks ⅓ of the possible advertising packets.

When a device enters into Initiator state and sends a CONNECT_REQ packet, it is very likely to collide if there are one or more active scanners in the vicinity. Generally, the problem is that Bluetooth LE is applied into uses it has not been initially designed, for example 50 people in the airport trying to find Wi-Fi access point service over Bluetooth LE. Due to the high number of LE scanners it is very difficult to make LE connection to the LE device and receive access point credentials over attribute protocol. In practice, the connecting LE device's signal level is not much higher that the interfering scanner devices' signal level.

C. Method for Non-Scannable Bluetooth LE Advertiser

The existing Bluetooth™ Core Specification, Version 4.2 specification has been defined to support connections between a central device and a peripheral device. As Bluetooth LE is progressively moving into the marketplace, it has been noted that the specification needs to be amended to support various multi-user use cases.

As Bluetooth LE is adopted in in new use cases, a need arises to allow an advertising device to indicate in the advertisement that additional information should not be requested from it without the establishment of a formal connection, for example by using a normal SCAN_REQ. This is needed to avoid collisions in the three advertising channels, between transmissions by scanning devices, where there may be several scanning devices receiving the advertisement at the same time. Currently connectable Bluetooth LE devices are not able advertise data and forbid scanners from sending SCAN_REQ packets for more information.

In accordance with an example embodiment of the invention, an advertising device is able to indicate in a new advertisement to scanner devices, that additional information should not be requested from the advertising device without the establishment of a formal connection. This enables Bluetooth LE advertising devices to have more opportunities for receiving CONNECT_REQ packets from initiator devices in a congested radio environment.

In accordance with an example embodiment of the invention, an advertising device may inform scanning devices with the new type of advertisement message, that there is no more information available to scanner devices without the establishment of a formal connection between the devices.

In accordance with an example embodiment of the invention, when a scanning device receives the new type of advertisement message, the scanning device refrains from sending a request for more information, unless the device is an initiator that is attempting to establish a formal connection with the advertising device.

In accordance with an example embodiment of the invention, an advertising device may include additional information in the advertising channel 16-bit header PDU, to inform scanners that SCAN_REQ packets shall not be transmitted in response to the advertising packet.

In accordance with an example embodiment of the invention, an advertising device may transmit a new type of advertising packet, which may be named, for example ADV_NONSCAN_IND, which informs the scanner that the scanner shall not transmit a SCAN_REQ packet in response to the advertising packet. The example new type of advertising packet may have its payload contents similar to or identical to the ADV_IND advertising packet.

In accordance with an example embodiment of the invention, an advertising device may transmit the new type of advertising packet, which may use one or more of the four bits in the reserved-for-future-use (RFU) field of the advertising channel PDU header, to indicate to the scanner the need to comply with an additional rule as to whether the scanner is allowed to transmit a SCAN_REQ packet in response to the advertising packet.

In accordance with an example embodiment of the invention, an advertising device may transmit the new type of advertising packet, wherein the new type of advertising packets are Bluetooth™ Low Energy advertising packets, which use four bits in a Packet Data Unit type (PDU type) field of an advertising channel PDU header, to indicate to scanning wireless devices a need to comply with a rule as to whether the scanning wireless devices are allowed to transmit a Bluetooth™ Low Energy SCAN_REQ packet in response to the new type of advertising packets.

In accordance with an example embodiment of the invention, if an advertising device has non-zero SCAN_RSP packet content (i.e. there actually is some useful information for the scanners to receive at least once), the advertising device may alter the header data of the advertising channel PDU. In this manner, for example, in every other advertising packet or advertising event, the scanners may be allowed to transmit a SCAN_REQ packet in response to the advertising packet, in order to receive SCAN_RSP data from the advertising device. The advertising device may alter the header data, if the advertising device has available information for scanning wireless devices. The alteration may include allowing scanning wireless devices to transmit requests for information from the advertising device, on a schedule specified by the advertising device in the advertising packet.

In accordance with an example embodiment of the invention, an advertising device may alter the advertising packet type or the advertising channel PDU header to change from prohibiting scanners sending SCAN_REQ packets, changing to allowing scanners to send SCAN_REQ packets, in response to the advertising device determining the number of received SCAN_REQs, CRC failures, or other traffic indications.

In accordance with an example embodiment of the invention, an advertising device may alter the advertising packet type and/or the advertising channel PDU header to allow one or more scanners to send a SCAN_REQ packet, for example, once but not twice during the scan.

Figure 1A:
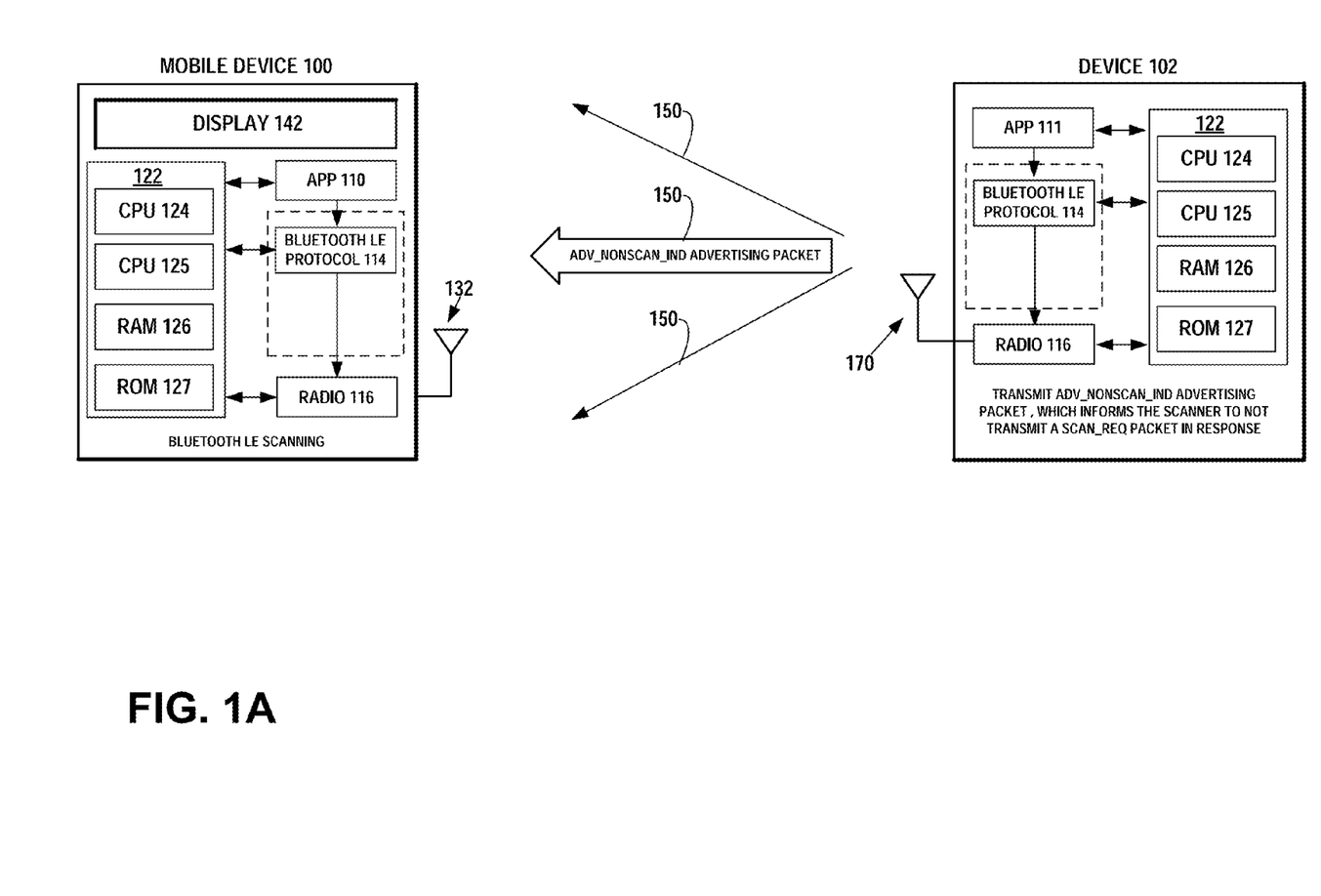
FIG. 1A is an illustration of an example embodiment of a network with an example wireless device and a mobile wireless device. The mobile wireless device is shown scanning for Bluetooth™ Low Energy protocol (BTLE) advertising messages. The wireless device is shown transmitting BTLE advertising messages, an ADV_NONSCAN_IND advertising packet, which informs the scanner to not transmit a SCAN_REQ packet in response, in accordance with at least one embodiment of the present invention.

FIG. 1A is an illustration of an example embodiment of a network with an example wireless device 102 and a mobile wireless device 100. The mobile wireless device 100 is shown scanning for Bluetooth™ Low Energy protocol (BTLE) advertising messages 150. The wireless device 102 is shown transmitting BTLE advertising messages 150, a new type ADV_NONSCAN_IND advertising packet, which informs the scanner mobile wireless device 100 to not transmit a SCAN_REQ packet in response, in accordance with at least one embodiment of the present invention.

The new type ADV_NONSCAN_IND advertising packet may have a format as shown, for example on FIG. 2A. The ADV_NONSCAN_IND advertising packet may have a payload field containing AdvA and AdvData fields, a shown for example in FIG. 2B. The AdvA field contains the wireless device's 102 public or random device address and the AdvData field may contain Advertising data shown in FIG. 2A.

In an example embodiment of the invention, the wireless device 102 determines whether it provides data for other wireless devices to request from the wireless device 102, in response to advertising messages 150 transmitted by the wireless device 102. The wireless device 102 transmits the new type ADV_NONSCAN_IND advertising packet 150 including an indication that additional information should not be requested from the wireless device 102, in response to the new type ADV_NONSCAN_IND advertising packet 150, without establishing a connection with the wireless device 102, the indication being in response to the determination that the wireless device 102 does not provide data for other wireless devices to request from the wireless device 102 in response to the new type ADV_NONSCAN_IND advertising packet 150. For example, the wireless device 102 may have information, but it has decided or is required to not provide such information, for example, because it is in a specific operation mode. An example of such an operation mode may for traffic management, when the advertising device 102 determines that there is a high volume of traffic, and in response, indicates that it does not provide data for other wireless devices, in order to deter the other devices from adding their requests to the traffic.

Figure 4:
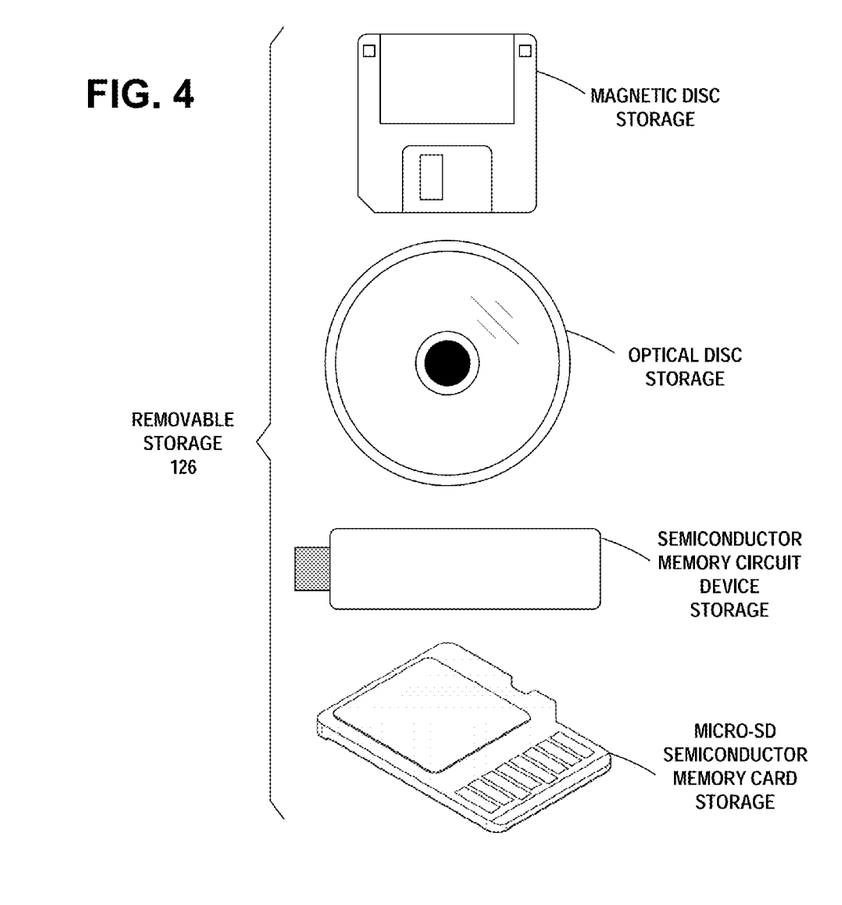
FIG. 4 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In example embodiments of the invention, the wireless mobile device 100 and the device 102 may include a processor 122 that includes from one to many central processing units (CPUs) 124 and/or 125, a random access memory (RAM) 126, a read only memory (ROM) 127, and interface circuits to interface with one or more radio transceivers 116, antenna 132, 170, and battery or house power sources. The wireless mobile device 100 may include a keypad, display 142, etc. The RAM and ROM can be removable memory devices such as smart cards, SIMs, WIMs, semiconductor memories such as RAM, ROM, PROMS, flash memory devices, etc., as shown in FIG. 4. In an example embodiment of the invention, the RAM 126 in the mobile wireless device 100 may store information contained in received advertising messages 150, for example, a description of the capabilities of the sending device 102 in received advertising messages 150.

In an example embodiment of the invention, the Bluetooth mobile wireless device 100 and the wireless device 102 include the Bluetooth™ Low Energy protocol (BTLE) 114.

In an example embodiment of the invention, the mobile wireless device 100 may be, for example, a miniature device such as a key fob, smart card, jewelry, or the like. In an example embodiment of the invention, the mobile wireless device 100 may be, for example, a relatively larger cell phone, smart phone, flip-phone, PDA, graphic pad. The mobile wireless device 100 may also be in an automobile or other vehicle. The wireless device 102 may be, for example, a service providing device that is either in a fixed position or mobile. In embodiments, the relative sizes of devices 100 and 102 may be arbitrary.

Figure 1B:
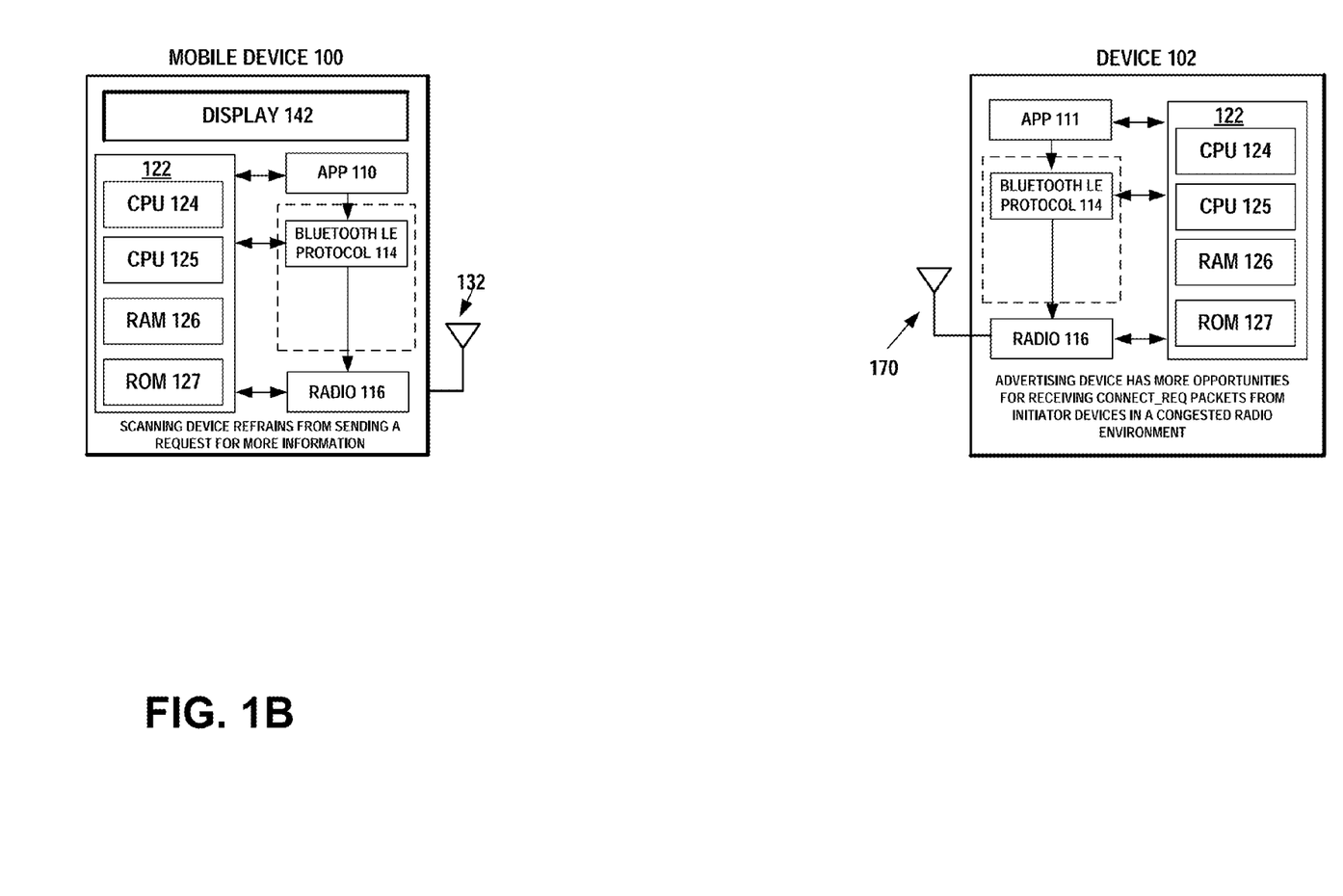
FIG. 1B is an illustration of an example embodiment of the network of FIG. 1A, wherein the mobile wireless device is shown refraining from sending a request for more information, in response to having received the new type ADV_NONSCAN_IND advertising packet, which informs the scanner to not transmit a SCAN_REQ packet in response, in accordance with at least one embodiment of the present invention.

FIG. 1B is an illustration of an example embodiment of the network of FIG. 1A, wherein the mobile wireless device 100 is shown refraining from sending a request for more information, in response to having received the new type ADV_NONSCAN_IND advertising packet 150, which informs the scanner mobile wireless device 100 to not transmit a SCAN_REQ packet in response, in accordance with at least one embodiment of the present invention.

FIG. 2A is an illustration of an example format for the Bluetooth™ Low Energy protocol (BTLE) the new type ADV_NONSCAN_IND advertising packet 150, in accordance with at least one embodiment of the present invention. The format of Advertising data and Scan Response data consists of a significant part and a non-significant part. The significant part contains a sequence of AD structures. Each AD structure shall have a Length field of one octet, which contains the Length value, and a Data field of Length octets. The first octet of the Data field contains the AD type field. The content of the remaining Length–1 octet in the Data field depends on the value of the AD type field and is called the AD data. The non-significant part extends the Advertising and Scan Response data to 31 octets and shall contain all-zero octets.

Figure 2B:
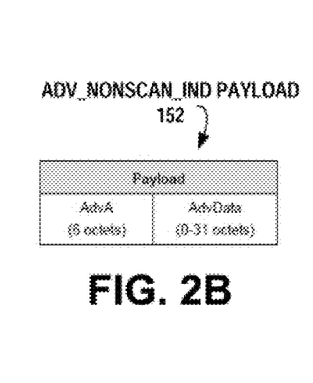
FIG. 2B is an illustration of an example format for the payload of the new type ADV_NONSCAN_IND advertising packet, in accordance with at least one embodiment of the present invention.

FIG. 2B is an illustration of an example format for the payload 152 of the new type ADV_NONSCAN_IND advertising packet 150, in accordance with at least one embodiment of the present invention. The payload field may contain AdvA and AdvData fields. The AdvA field contains the advertiser's public or random device address and the AdvData field may contain Advertising data from the advertiser's host.

Figure 2C:
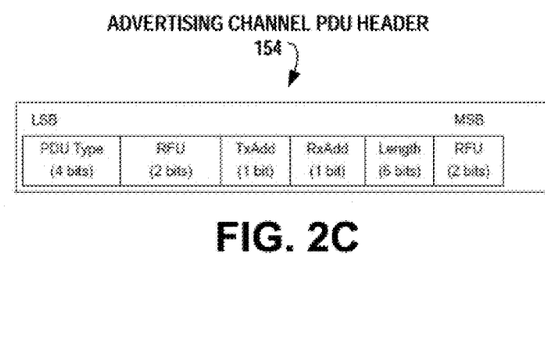
FIG. 2C is an illustration of an example format for the advertising channel PDU header for the new type ADV_NONSCAN_IND advertising packet, in accordance with at least one embodiment of the present invention.

FIG. 2C is an illustration of an example format for the advertising channel PDU header 154 for the new type ADV_NONSCAN_IND advertising packet 150, in accordance with at least one embodiment of the present invention.

Figure 2D:
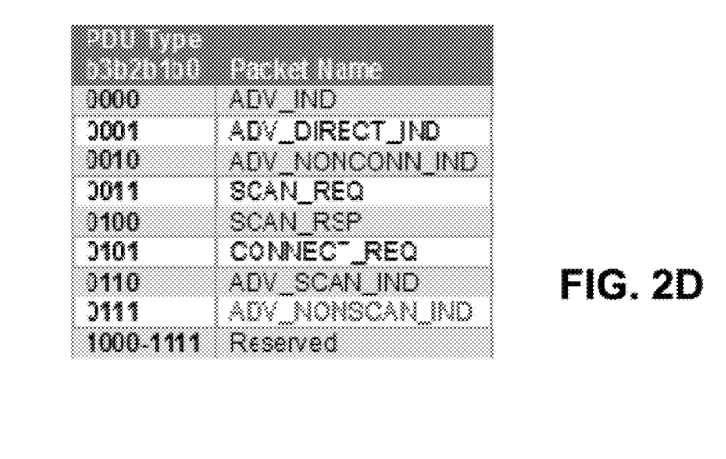
FIG. 2D is an illustration of the PDU type field in the advertising channel PDU header, to define ADV_NONSCAN_IND with the reserved bits "0111" indicating this, in accordance with at least one embodiment of the present invention.

An advertising device 102 may include additional information in the advertising channel 16-bit header PDU, to inform scanners that SCAN_REQ packets shall not be transmitted in response to the advertising packet. The advertising device may use the PDU type field to define ADV_NONSCAN_IND with the reserved bits "0111" indicating this, as shown in FIG. 2D.

Another option is that advertising device 102 uses one or more of the four bits in the reserved-for-future-use (RFU) field of the advertising channel PDU header 154, to indicate to the scanner the need to comply with an additional rule as to whether the scanner is allowed to transmit a SCAN_REQ packet in response to the advertising packet.

In accordance with an example embodiment of the invention, if the advertising device 102 has non-zero SCAN_RSP packet content (i.e. there actually is some useful information for the scanners to receive at least once), the advertising device 102 may alter the header data 154 of the advertising channel PDU. In this manner, for example, in every other advertising packet or advertising event, the scanners 100 may be allowed to transmit a SCAN_REQ packet in response to the advertising packet 150, in order to receive SCAN_RSP data from the advertising device 102.

In accordance with an example embodiment of the invention, an advertising device may alter the advertising channel PDU header 154 to change from prohibiting scanners sending SCAN_REQ packets, changing to allowing scanners to send SCAN_REQ packets, in response to the advertising device 102 determining the number of received SCAN_REQs, CRC failures, or other traffic indications.

In accordance with an example embodiment of the invention, the advertising device 102 may alter the advertising channel PDU header 154 to allow one or more scanners 100 to send a SCAN_REQ packet, for example, once but not twice during the scan.

Figure 3A:
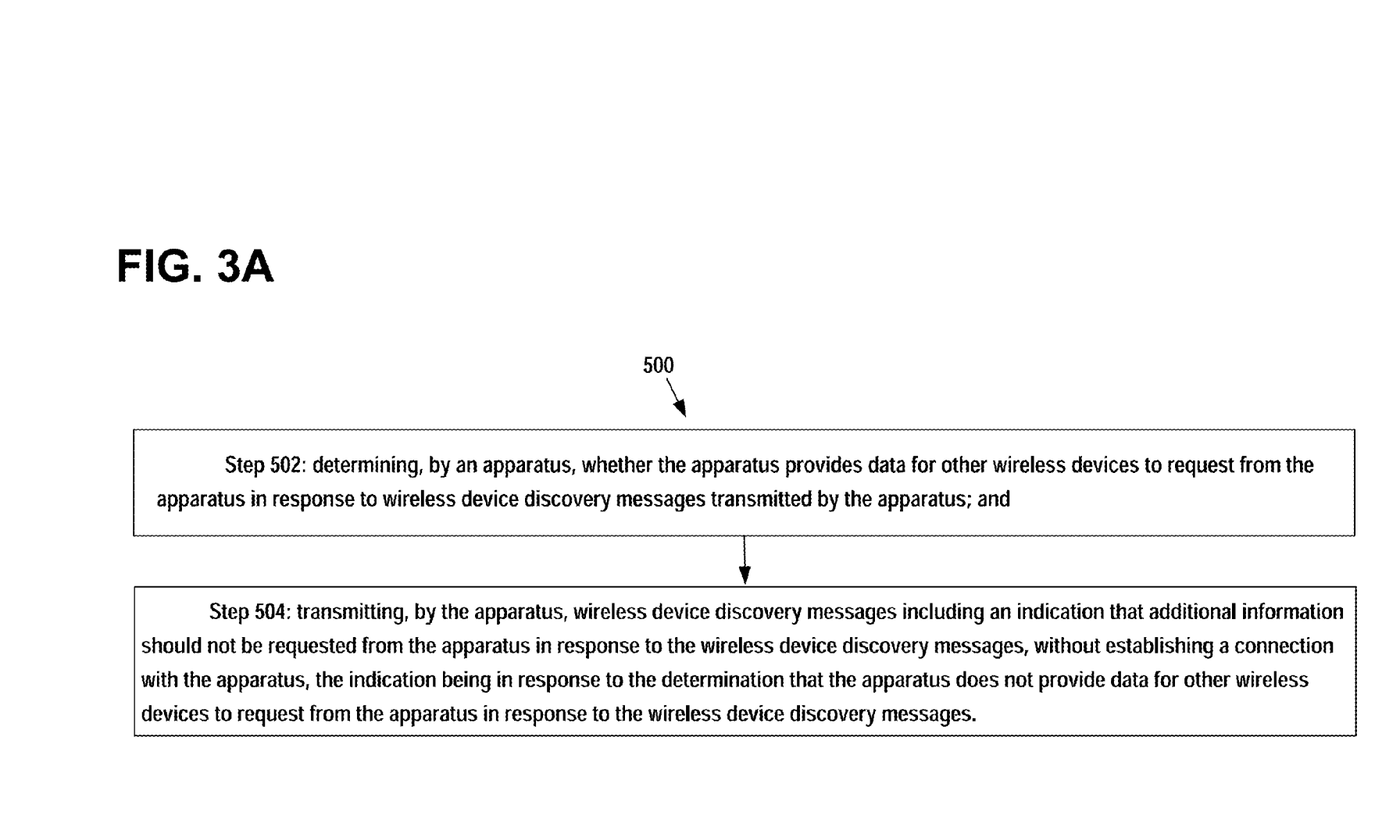
FIG. 3A is an illustration of an example flow diagram of an example process in the mobile wireless device, carrying out the example operations, in accordance with at least one embodiment of the present invention.

FIG. 3A is an illustration of an example flow diagram 500 of an example process in the mobile wireless device 100, carrying out the example operations, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 502: determining, by an apparatus, whether the apparatus provides data for other wireless devices to request from the apparatus in response to wireless device discovery messages transmitted by the apparatus; and Step 504: transmitting, by the apparatus, wireless device discovery messages including an indication that additional information should not be requested from the apparatus in response to the wireless device discovery messages, without establishing a connection with the apparatus, the indication being in response to the determination that the apparatus does not provide data for other wireless devices to request from the apparatus in response to the wireless device discovery messages.

Figure 3B:
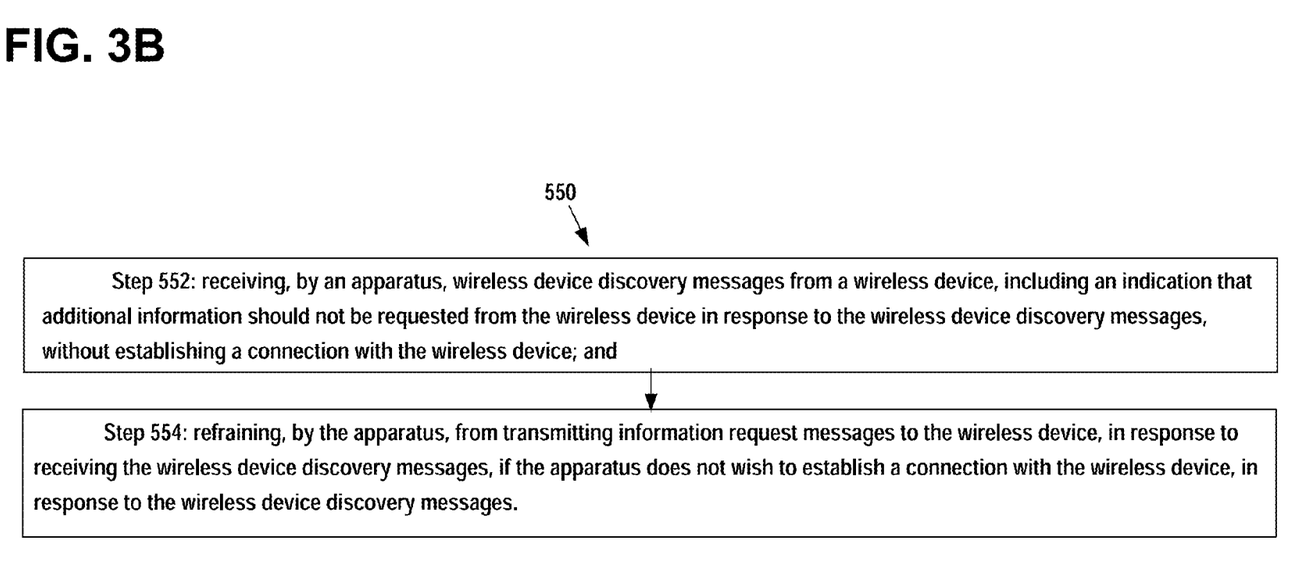
FIG. 3B is an illustration of an example flow diagram of an example process in the wireless device, carrying out the example operations, in accordance with at least one embodiment of the present invention.

FIG. 3B is an illustration of an example flow diagram 550 of an example process in the wireless device 102, carrying out the example operations, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 552: receiving, by an apparatus, wireless device discovery messages from a wireless device, including an indication that additional information should not be requested from the wireless device in response to the wireless device discovery messages, without establishing a connection with the wireless device; and Step 554: refraining, by the apparatus, from transmitting information request messages to the wireless device, in response to receiving the wireless device discovery messages, if the apparatus does not wish to establish a connection with the wireless device, in response to the wireless device discovery messages.

FIG. 4 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable non-transitory media such as resident memory devices, smart cards or other removable memory devices, thereby making a computer program product or article of manufacture according to the embodiments.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   determining, by an apparatus, whether the apparatus provides data for other wireless devices to request from the apparatus in response to wireless device discovery messages transmitted by the apparatus; and
   transmitting, by the apparatus, wireless device discovery messages including an indication that additional information should not be requested from the apparatus in response to the wireless device discovery messages, without establishing a connection with the apparatus, the indication being in response to the determination that the apparatus does not provide data for other wireless devices to request from the apparatus in response to the wireless device discovery messages.

2. The method of claim 1, wherein the apparatus includes information in an advertising channel packet header, to inform other wireless devices that requests for information from the apparatus, shall not be transmitted in response to the wireless device discovery messages.

3. The method of claim 1, wherein the wireless device discovery messages are advertising packets that inform scanning wireless devices that the scanning wireless devices shall not transmit an information request packet in response to the advertising packets, without establishing a connection with the apparatus.

4. The method of claim 1, wherein the wireless device discovery messages are Bluetooth™ Low Energy advertising packets, which use four bits in a Packet Data Unit type (PDU type) field of an advertising channel PDU header, to indicate to scanning wireless devices a need to comply with a rule as to whether the scanning wireless devices are allowed to transmit a Bluetooth™ Low Energy SCAN_REQ packet in response to the advertising packets.

5. The method of claim 1, further comprising:
altering, by the apparatus, the indication that additional information should not be requested from the apparatus, if the apparatus has available information for scanning wireless devices, the alteration including allowing scanning wireless devices to transmit requests for information from the apparatus, on a schedule specified by the apparatus in the wireless device discovery messages.

6. The method of claim 1, further comprising:
altering, by the apparatus, the indication that additional information should not be requested from the apparatus, in response to the apparatus determining a number of received information requests or CRC failures.

7. A method, comprising:
receiving, by an apparatus, wireless device discovery messages from a wireless device, including an indication that additional information should not be requested from the wireless device in response to the wireless device discovery messages, without establishing a connection with the wireless device; and
refraining, by the apparatus, from transmitting information request messages to the wireless device, in response to receiving the wireless device discovery messages, if the apparatus does not wish to establish a connection with the wireless device, in response to the wireless device discovery messages.

8. The method of claim 7, further comprising:
transmitting, by the apparatus, one or more wireless connection request messages to the wireless device, if the apparatus wishes to establish a connection with the wireless device, in response to the wireless device discovery messages.

9. The method of claim 7, wherein the wireless device discovery messages are Bluetooth™ Low Energy advertising packets, which use four bits in a Packet Data Unit type (PDU type) field of an advertising channel PDU header, to indicate to scanning wireless devices a need to comply with a rule as to whether the scanning wireless devices are allowed to transmit a Bluetooth™ Low Energy SCAN_REQ packet in response to the advertising packets.

10. The method of claim 7, further comprising:
transmitting, by the apparatus, requests for information to the wireless device, on a schedule specified by the wireless device in the wireless device discovery messages.

11. An apparatus, comprising:
at least one processor;
at least one memory including computer program code;
the at least one memory and the computer program code configured to, with the at least one processor, cause the apparatus at least to:
determine whether the apparatus provides data for other wireless devices to request from the apparatus in response to wireless device discovery messages transmitted by the apparatus; and
transmit wireless device discovery messages including an indication that additional information should not be requested from the apparatus in response to the wireless device discovery messages, without establishing a connection with the apparatus, the indication being in response to the determination that the apparatus does not provide data for other wireless devices to request from the apparatus in response to the wireless device discovery messages.

12. The apparatus of claim 11, wherein the apparatus includes information in an advertising channel packet header, to inform other wireless devices that requests for information from the apparatus, shall not be transmitted in response to the wireless device discovery messages.

13. The apparatus of claim 11, wherein the wireless device discovery messages are advertising packets that inform scanning wireless devices that the scanning wireless devices shall not transmit an information request packet in response to the advertising packets, without establishing a connection with the apparatus.

14. The apparatus of claim 11, wherein the wireless device discovery messages are Bluetooth™ Low Energy advertising packets, which use four bits in a Packet Data Unit type (PDU type) field of an advertising channel PDU header, to indicate to scanning wireless devices a need to comply with a rule as to whether the scanning wireless devices are allowed to transmit a Bluetooth™ Low Energy SCAN_REQ packet in response to the advertising packets.

15. The apparatus of claim 11, further comprising:
the at least one memory and the computer program code configured to, with the at least one processor, cause the apparatus at least to:
alter the indication that additional information should not be requested from the apparatus, if the apparatus has available information for scanning wireless devices, the alteration including allowing scanning wireless devices to transmit requests for information from the apparatus, on a schedule specified by the apparatus in the wireless device discovery messages.

16. The apparatus of claim 11, further comprising:
the at least one memory and the computer program code configured to, with the at least one processor, cause the apparatus at least to:
alter the indication that additional information should not be requested from the apparatus, in response to the apparatus determining a number of received information requests or CRC failures.

17. An apparatus, comprising:
at least one processor;
at least one memory including computer program code;
the at least one memory and the computer program code configured to, with the at least one processor, cause the apparatus at least to:
receive wireless device discovery messages from a wireless device, including an indication that additional information should not be requested from the wireless device in response to the wireless device discovery messages, without establishing a connection with the wireless device; and
refrain from transmitting information request messages to the wireless device, in response to receiving the wireless device discovery messages, if the apparatus does not wish to establish a connection with the wireless device, in response to the wireless device discovery messages.

18. The apparatus of claim 17, further comprising:
the at least one memory and the computer program code configured to, with the at least one processor, cause the apparatus at least to:
transmit one or more wireless connection request messages to the wireless device, if the apparatus wishes to establish a connection with the wireless device, in response to the wireless device discovery messages.

19. The apparatus of claim 17, wherein the wireless device discovery messages are Bluetooth™ Low Energy advertising packets, which use four bits in a Packet Data Unit type (PDU type) field of an advertising channel PDU header, to indicate to scanning wireless devices a need to comply with a rule as to whether the scanning wireless devices are allowed to transmit a Bluetooth™ Low Energy SCAN_REQ packet in response to the advertising packets.

20. The apparatus of claim 17, further comprising:
the at least one memory and the computer program code configured to, with the at least one processor, cause the apparatus at least to:
transmit requests for information to the wireless device, on a schedule specified by the wireless device in the wireless device discovery messages.

21. A computer program product comprising computer executable program code recorded on a computer readable, non-transitory storage medium, the computer executable program code comprising:
code for determining, by an apparatus, whether the apparatus provides data for other wireless devices to request from the apparatus in response to wireless device discovery messages transmitted by the apparatus; and
code for transmitting, by the apparatus, wireless device discovery messages including an indication that additional information should not be requested from the apparatus in response to the wireless device discovery messages, without establishing a connection with the apparatus, the indication being in response to the determination that the apparatus does not provide data for other wireless devices to request from the apparatus in response to the wireless device discovery messages.

22. A computer program product comprising computer executable program code recorded on a computer readable, non-transitory storage medium, the computer executable program code comprising:
code for receiving, by an apparatus, wireless device discovery messages from a wireless device, including an indication that additional information should not be requested from the wireless device in response to the wireless device discovery messages, without establishing a connection with the wireless device; and
code for refraining, by the apparatus, from transmitting information request messages to the wireless device, in response to receiving the wireless device discovery messages, if the apparatus does not wish to establish a connection with the wireless device, in response to the wireless device discovery messages.

\* \* \* \* \*